US010074979B2

(12) United States Patent
Kim et al.

(10) Patent No.: US 10,074,979 B2
(45) Date of Patent: Sep. 11, 2018

(54) SYSTEM AND METHOD FOR CONTROLLING MULTI-FREQUENCIES OF A MICROGRID

(71) Applicant: INCHEON UNIVERSITY INDUSTRY ACADEMIC COOPERATION FOUNDATION, Incheon (KR)

(72) Inventors: Hak-Man Kim, Seoul (KR); Hyeong Jun Yoo, Incheon (KR)

(73) Assignee: INCHEON UNIVERSITY INDUSTRY ACADEMIC COOPERATION FOUNDATION, Incheon (KR)

( * ) Notice: Subject to any disclaimer, the term of this patent is extended or adjusted under 35 U.S.C. 154(b) by 0 days.

(21) Appl. No.: 15/122,895

(22) PCT Filed: Aug. 26, 2015

(86) PCT No.: PCT/KR2015/008905
§ 371 (c)(1),
(2) Date: Aug. 31, 2016

(87) PCT Pub. No.: WO2017/018584
PCT Pub. Date: Feb. 2, 2017

(65) Prior Publication Data
US 2018/0131183 A1    May 10, 2018

(30) Foreign Application Priority Data

Jul. 29, 2015    (KR) .................. 10-2015-0107199

(51) Int. Cl.
*H02J 3/06*  (2006.01)
*H02J 3/02*  (2006.01)
(Continued)

(52) U.S. Cl.
CPC .............. *H02J 3/06* (2013.01); *G05F 1/70* (2013.01); *H02J 3/02* (2013.01); *H02J 3/382* (2013.01)

(58) Field of Classification Search
CPC ..... H02J 3/06; H02J 3/382; H02J 3/02; G05F 1/70
See application file for complete search history.

(56) References Cited

U.S. PATENT DOCUMENTS

2008/0103630 A1    5/2008    Eckroad

FOREIGN PATENT DOCUMENTS

| KR | 10-2011-0069242 A | 6/2011 |
| KR | 10-2014-0039511 A | 4/2014 |
| WO | 2014/103192 A1 | 7/2014 |

OTHER PUBLICATIONS

Korean Patent Abstract (in English) of KR Pub. No. 10-2011-0069242 A, Pub. Date Jun. 23, 2011, downloaded Aug. 19, 2016 from http://kpa.kipris.or.kr/kpa.
(Continued)

*Primary Examiner* — Robert Deberadinis
(74) *Attorney, Agent, or Firm* — Barcelo, Harrison & Walker, LLP

(57) ABSTRACT

The present invention relates to a voltage source converter based DC connection method and a control method for implementing a system for maintaining respective different frequencies (multi-frequencies) by reflecting load quality levels of respective microgrids when multiple stand-alone microgrids are connected to each other in which voltage source converters (VSCs) installed at connection points of the microgrids for effectively controlling respective microgrids having different frequency control ranges present an effective control method based on a concept using normalizing frequencies of unit microgrids to be similarly applied in an islanded operation mode of multiple grid-connected (Continued)

microgrids as well as multiple stand-alone microgrids to avoid the same frequency criterion and enable an economic operation to which the load power quality level of the microgrid is reflected, thereby minimizing a transient to stably operate a microgrid system.

12 Claims, 10 Drawing Sheets

(51) Int. Cl.
      *G05F 1/70*     (2006.01)
      *H02J 3/38*     (2006.01)

(56)           References Cited

OTHER PUBLICATIONS

WIPO Abstract (in English) of WO Pub. No. 2014/103192 A1, Pub. Date Jul. 3, 2014, downloaded Oct. 6, 2016 from http://patentscope.wipo.int/search/en/.
International Search Report, Int'l App. No. PCT/JP2013/007163 (Int'l Pub. No. WO2014/103192 A1), Pub. Date Jul. 3, 2014.
Korean Patent Abstract (in English) of KR Pub. No. 10-2014-0039511 A, Pub. Date Apr. 2, 2014, downloaded Aug. 19, 2016 from http://kpa.kipris.or.kr/kpa.
Korean Patent Abstract (in English) of KR Pub. No. 10-2014-0098431 A, Pub. Date Aug. 8, 2014, downloaded Aug. 19, 2016 from http://kpa.kipris.or.kr/kpa.

SYSTEM AND METHOD FOR CONTROLLING MULTI-FREQUENCIES OF A MICROGRID

CROSS-REFERENCE TO RELATED APPLICATIONS

This application is the national stage for International Patent Cooperation Treaty Application PCT/KR2015/008905, filed Aug. 26, 2015, which claims priority from Korean Patent Application No. 10-2015-0107199, filed Jul. 29, 2015, in the Korean Intellectual Property Office. The entire contents of said applications are incorporated herein by reference for all purposes.

BACKGROUND

Technical Field

The present invention relates to controlling multi-frequencies of a microgrid.

Background Art

In recent years, stand-alone microgrids adopting new and renewable energy source based distribution power system and energy storage system have been actively spread in island regions, and various types of grid-connected microgrids including a campus microgrid, a military microgrid, an industrial complex microgrid have been propagating on land.

In particular, in case of operation of stand-alone microgrid or an islanded operation mode of the grid-connected microgrid (hereinafter, referred to as an islanded operation mode), a conventional microgrid is designed to be operated at a rated frequency (60 Hz or 50 Hz), but operating microgrid, which has different power quality requirement according to load configuration, with same rated requires a slightly excessive facility investment in an economic aspect.

Further, at present, a technique of a single microgrid is primarily propagated, but multiple microgrids are installed in the island regions. Thus, a connection among stand-alone microgrids (hereinafter, referred to as multiple stand-alone microgrids) is inevitable for economic and stable operation and emergence of a lot of multiple stand-alone microgrids is later predicted.

In this regard, frequency management suitable for a load power quality level for each stand-alone microgrid or islanded operation mode microgrid is required in the economic aspect and technological development associated therewith is required.

In particular, when the multiple stand-alone microgrids are operated in connection with an AC power line, frequencies of all microgrids become the same. Therefore, multi-frequency control considering the power quality level of the load of each microgrid is impossible, and thus a new technique for realizing the multi-frequency control is required.

DISCLOSURE

Technical Problem

In order to solve the problem, the present invention has been made in an effort to provide a technique that enables controlling multi-frequencies through a DC line for connection of multiple stand-alone microgrids.

Technical Solution

According to an aspect of the present invention, a system for controlling multi-frequencies of a microgrid includes: a stand-alone (off-grid) microgrid including one or more distribution power supplies and energy storage systems; and a voltage source converter (VSC) connecting multiple stand-alone microgrids through a DC line and performing power conversion for the DC connection of AC based stand-alone microgrids and performing multi-frequency control considering a load quality level for each microgrid.

According to another aspect of the present invention, a method for controlling multi-frequencies of a microgrid includes: normalizing, by a normalizing unit of a voltage source converter (VSC), allowable frequencies for multiple stand-alone microgrids; outputting, by an error output unit, an error between frequencies corresponding to the normalized frequencies of the microgrids; performing, by a PI controller, a correction for making the output error between the normalized frequencies be 0 and deciding reference DC current through a predetermined equation; and outputting, by the error output unit, an error between the decided reference d-axis current and actual d-axis current to generate, by a current controller, a control signal for controlling the multi-frequencies.

Advantageous Effects

According to the present invention, it is possible to adjust power supply by using a frequency of a microgrid and rapidly cope with frequency fluctuations and a transient is minimized there through to stably operate a microgrid system.

Further, according to the present invention, by overcoming a lack of a multi-frequency control technology in multiple stand-alone microgrids by evolution of a connection technology of the multiple stand-alone microgrids which has grown in recent years, multi-frequency control can be performed based on a DC line in a multiple stand-alone microgrid system which is operated within the same allowable frequency range based on an AC power line.

In addition, a voltage source converter according to the present invention performs a bipolar operation to perform power transmission through the other pole when a failure occurs in any one pole. As a result, since the power transmission is enabled through the other pole even though failure occurs in one pole, a robust reliability based connection for power supply among the multiple stand-alone microgrids is enabled, thereby stably maintaining a frequency and voltage of the microgrid.

DETAILED DESCRIPTION

Best Mode

Figure 1:
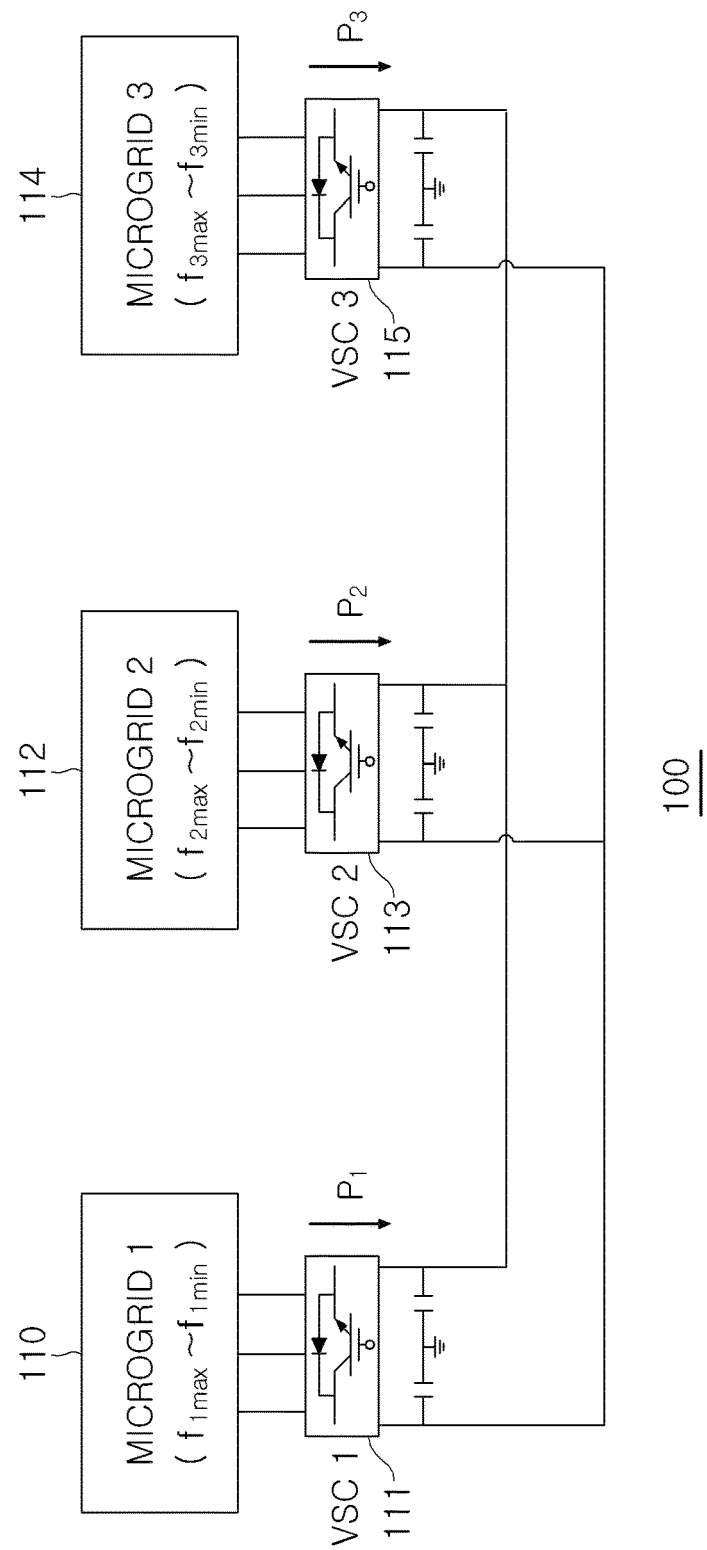
FIG. 1 is a configuration diagram schematically illustrating a system for controlling multi-frequencies of a microgrid according to an embodiment of the present invention.

Hereafter, preferred embodiments of the present invention will be described in detail with reference to the accompanying drawings. In the following description, specific matters including detailed constituent devices and the like are described and are just provided to help more overall appreciation in the present invention and it will be apparent to those skilled in the art that predetermined modifications or changes of the specific matters can be made within the scope of the present invention.

The present invention relates to control of multi-frequencies of multiple stand-alone microgrids and more particularly, has been made in an effort to provide a technique that determines whether power supply excess or power supply shortage occurs based on a frequency for each microgrid and controls a balance of power supply and demand for each microgrid by increasing an effective power supply amount to a DC line of a VSC when the power supply excess occurs, and decreasing the effective power supply amount to the DC line of the VSC or increasing received effective wattage from the DC line when the power supply shortage occurs, through current control of each voltage source converter (VSC) connected to a connection point of the microgrid, to adaptively execute the multi-frequency control considering a load quality level for each of the multiple stand-alone microgrids which are connected. To do this, the present invention normalizes input allowable frequencies for the multiple stand-alone microgrids for the adaptive execution of the multi-frequency control and similarly controls the normalized frequencies associated with the allowable frequencies of the multiple microgrids by using as an input the normalized frequency of corresponding microgrid and the normalized frequency of the microgrid corresponding to the VSC followed by 1 based on a predetermined order relationship in order to correct an error between frequencies corresponding to the normalized frequencies of the microgrids to 0. By doing so, the present invention can adjust power supply of the microgrid and rapidly cope with frequency fluctuation and minimize a transient there through to stably operate a microgrid system. Further, the present invention can perform multi-frequency control based on a DC line in a multiple microgrid system which is operated within the same allowable frequency range based on an AC power line by overcoming a lack of a multi-frequency control technology in multiple stand-alone microgrids by evolution of a connection technology of the multiple stand-alone microgrids which has grown in recent years.

In addition, in describing a system for controlling multi-frequencies of a microgrid to be described below, three unit microgrids and three voltage source converters (VSCs) connected to unit microgrid connection points are described as an example, but it is apparent that the present invention is not limited thereto and it is previously revealed that in a system according to the present invention, two or more multiple microgrids are connected to the DC line through the VSCs to supply and receive power.

Further, the present invention is applied to the multi-frequency control of the multiple stand-alone microgrids and since in the present invention to be described below, it is previously revealed that since an islanded operation mode of a grid-connected microgrid and an islanded operation mode of stand-alone microgrid are the same concept, an application range is extended and proposed up to a method for controlling multi-frequencies in an stand-alone operation mode of multiple grid-connected microgrids.

Hereinafter, a configuration of a system for controlling multi-frequencies of multiple stand-alone microgrids according to an embodiment of the present invention will be described in detail with reference to FIGS. 1 to 3.

FIG. 1 is a configuration diagram schematically illustrating a system for controlling multi-frequencies of multiple stand-alone microgrids according to an embodiment of the present invention.

Referring to FIG. 1, a microgrid system 100 according to an embodiment of the present invention includes multiple stand-alone microgrids 110, 112, and 114 and voltage source converters (VSCs) 111, 113, and 115 corresponding to the respective microgrids 110, 112, and 114 one to one.

The microgrids 110, 112, and 114 mean stand-alone microgrids including one or more distribution power supplies and energy storage systems.

The microgrids 110, 112, and 114 further includes a commercial energy storage system, an emergency energy storage system, a static transfer switch (STS), a switch, an automatic load switch, and a load consuming power although not illustrated in FIG. 1 and selectively includes power elements including distribution power supplies including a wind generator, a solar cell array, and an engine generator, and the like as necessary.

The VSCs 111, 113, and 115 are installed at connection points of the stand-alone microgrids 110, 112, and 114 to convert AC power in the unit stand-alone microgrids 110, 112, and 114 into DC and supply the DC to a DC line and further, the VSCs 111, 113, and 115 perform a power converting function to convert the received DC power into the AC and supply the converted AC to the unit stand-alone microgrids 110, 112, and 114 when receiving the DC power from the DC line, and further, perform multi-frequency control considering a load quality level for each of the microgrids 110, 112, and 114.

The VSCs 111, 113, and 115 to which the present invention is applied include a normalizing unit connected with corresponding adjacent VSCs for each microgrid to normalize an allowance frequency for each microgrid and the VSC performs inter-VSC communication in order to acquire frequency information of an adjacent microgrid.

In more detail, as illustrated in FIG. 1, the respective microgrids 110, 112, and 114 of the multi-frequency controlling system 100 of the multiple stand-alone microgrids to which the present invention is applied are connected to the DC line through the VSCs 111, 113, and 115 corresponding thereto to perform adaptive multi-frequency control considering different load power quality levels for the respective microgrids 110, 112, and 114.

Herein, when the adaptive multi-frequency control is described, first, the respective VSCs 111, 113, and 115 according to an embodiment of the present invention are connected to the DC line and different frequencies are set in the respective microgrids 110, 112, and 114 and the different frequencies become allowable frequencies for the corresponding microgrids. For example, allowable frequency ranges are different from each other in such a manner that 59.2 to 60.8 Hz are set in a first microgrid 110, 59.7 to 60.3 Hz are set in a second microgrid 112, and 59.5 to 60.5 Hz are set in a third microgrid 114.

Figure 2:
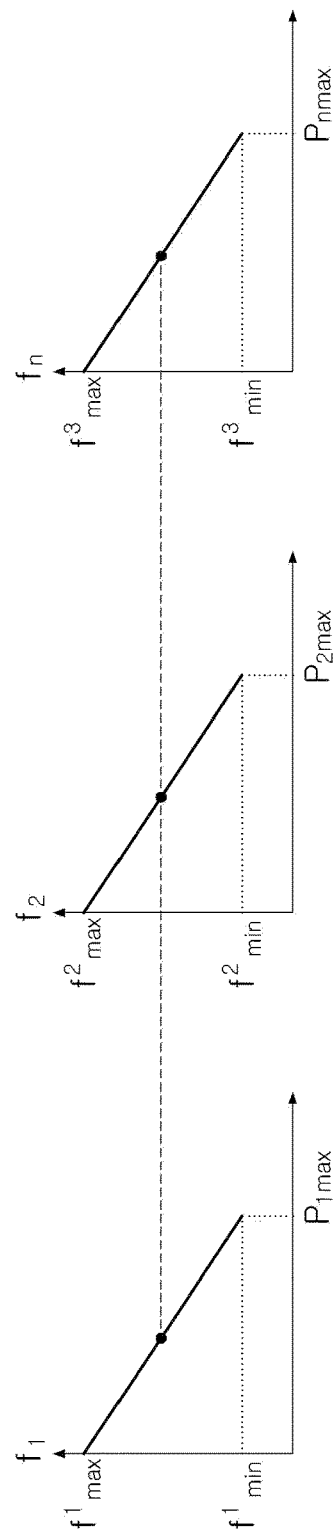
FIG. 2 is a control conceptual diagram of a voltage source converter in the system for controlling multi-frequencies of a microgrid according to an embodiment of the present invention.

The VSCs 111, 113, and 115 normalize input frequencies for multiple microgrids through the normalizing unit and control normalized frequencies −1 to 1 for the respective stand-alone microgrids 110, 112, and 114 to be maintained at the same value as illustrated in FIG. 2. For example, when a frequency $f_{normal}^1$ of one microgrid becomes 0.1, frequencies $f_{normal}^2$, $f_{normal}^n$ of all microgrids are controlled to be maintained at 0.1.

To this end, the VSC to which the present invention is applied normalizes the allowable frequencies set differently for the respective microgrids to −1 to 1 by using an equation given below through the normalizing unit.

$$f_{normal}^n = \frac{f - 0.5(f_{max}^n + f_{min}^n)}{0.5(f_{max}^n - f_{min}^n)}, -1 \leq f_{normal}^n \leq 1 \quad \text{Equation 1}$$

In this case, the VSC performs control for making a difference of normalized values of two adjacent microgrids be "0" in order to make normalized values of all microgrids 110, 112, and 114 which are grid-connected be the same as each other.

For example, when n microgrids are present, a k-th VSC performs control for making a difference of the normalized values be 0 by inputting a normalized frequency of a k-th microgrid and a k+1-th normalized frequency.

In other words, each of the VSCs connected to the connection points of the multiple microgrids which are grid-connected makes a difference in normalized frequency between DC-line based adjacent microgrids be 0 by using, as an input, a normalized frequency of corresponding microgrid and a normalized frequency of the microgrid connected to a VSC followed by 1 based on a predetermined order relationship, to control normalized frequencies associated with allowable frequencies of the multiple connected microgrids to be the same as each other.

Herein, the predetermined order relationship means a ranking for each microgrid and in the present invention, in order to make the normalized frequencies of the multiple microgrids through the ranking be the same as each other, control for making a difference between normalized frequencies of two adjacent microgrids by identifying the adjacent microgrids be 0 is performed.

Further, for the control for making the difference between the normalized values of two adjacent microgrids be "0" in order to make the normalized values of all of the microgrids 110, 112, and 114 be the same as each other, a VSC having a lowest ranking based on the predetermined order relationship among the respective VSCs connected to the multiple microgrids which are connected controls the normalized frequencies associated with the allowable frequencies of the connected multiple microgrids by making the difference in normalized frequency between the adjacent microgrids based on the DC line be 0 by using, as an input, the normalized frequency of the corresponding microgrid and the normalized frequency of the microgrid corresponding to the VSC preceding by 1 based on the predetermined order relationship.

That is, a last n-th VSC performs control for making the difference in normalized values be 0 by inputting a normalized frequency of an n-th microgrid and a normalized frequency of an (n−1)-th microgrid.

As described above, the control for making the normalized frequencies of the respective stand-alone microgrids in the microgrid system be the same as each other based on the predetermined order relationship will be described for each controller with reference to FIG. 3.

Figure 3:
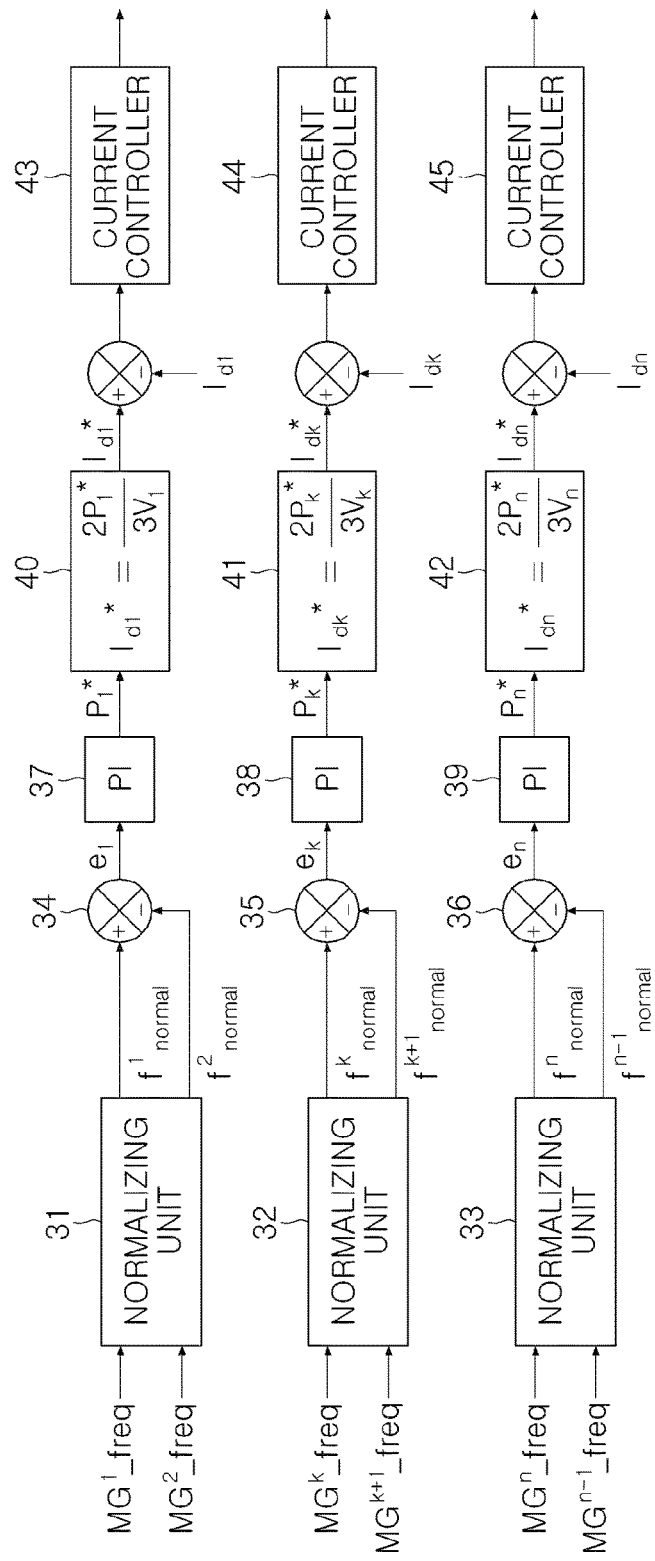
FIG. 3 is a block diagram for performing frequency control of VSC for each microgrid with respect to n microgrids in the system for controlling multi-frequencies of a microgrid according to an embodiment of the present invention.

Referring to FIG. 3, FIG. 3 is a block diagram for performing frequency control of VSC-n connected to n microgrids in the system for controlling multi-frequencies of multiple stand-alone microgrids according to an embodiment of the present invention.

As illustrated in FIG. 3, $MG^n\_freq$ represents a frequency of the n-th microgrid, $P_n^*$ represents wattage of the n-th VSC for making the difference in normalized frequency be 0, and $V_n$ represents AC voltage of the n-th microgrid and normalizing units 31, 32, and 33 of VSCs for respective microgrids normalize allowable frequencies, $MG^n\_freq$ of multiple microgrids, which are input, and normalized frequencies $f_{normal}^1$, $f_{normal}^2$, $f_{normal}^k$, $f_{normal}^{k+1}$, $f_{normal}^n$, $f_{normal}^{n-1}$ between two adjacent microgrids are input into respective corresponding error output units 34, 35, and 36 from the normalizing units 31, 32, and 33, respectively, in order to correct an error among the frequencies corresponding to the normalized frequencies of the microgrids to 0, and correction for making the output error among the normalized frequencies be 0 is performed by using each of PI controllers 37, 38, and 39. The PI controllers 37, 38, and 39 multiply appropriate proportional constant gains based on $e_1$, $e_k$, and $e_n$ output from the respective error output units 34, 35, and 36 associated with a difference in frequency between two microgrids and integrate $e_1$, $e_k$, and $e_n$ to output $P_1$, $P_k$, and $P_n$.

Thereafter, current for each microgrid is decided through a predetermined current decision equation of VSC controllers 40, 41, and 42.

In this case, the current decision equation has a form of $$I_{d1}^* = \frac{2P_1^*}{3V_1}$$

and since effective power needs to be changed in order to change the frequency of the microgrid premised on a known frequency equation and an effective power equation, d-axis current $I_{d1}^*$, $I_{dk}^*$, and $I_{dn}^*$ for frequency control is decided through the respective VSC controllers 40, 41, and 42 and respective errors of the decided d-axis current and actual d-axis current are output to output control signals for controlling the multi-frequencies through current controllers 43, 44, and 45.

As described above, the normalized frequency value for each microgrid according to the present invention is input into a controller of the VSC connected to each microgrid to control supply and reception of power so as to control the normalized frequency value for each microgrid to be the same as each other.

Furthermore, the VSC according to an embodiment of the present invention performs a bipolar operation to perform power transmission through the other one when a failure occurs in any one pole. As a result, since the power transmission is enabled through the other pole even though the failure occurs in one pole, a robust reliability based connection for power supply among the multiple microgrids is enabled, thereby stably maintaining a frequency and voltage of the microgrid system.

Figure 4A:
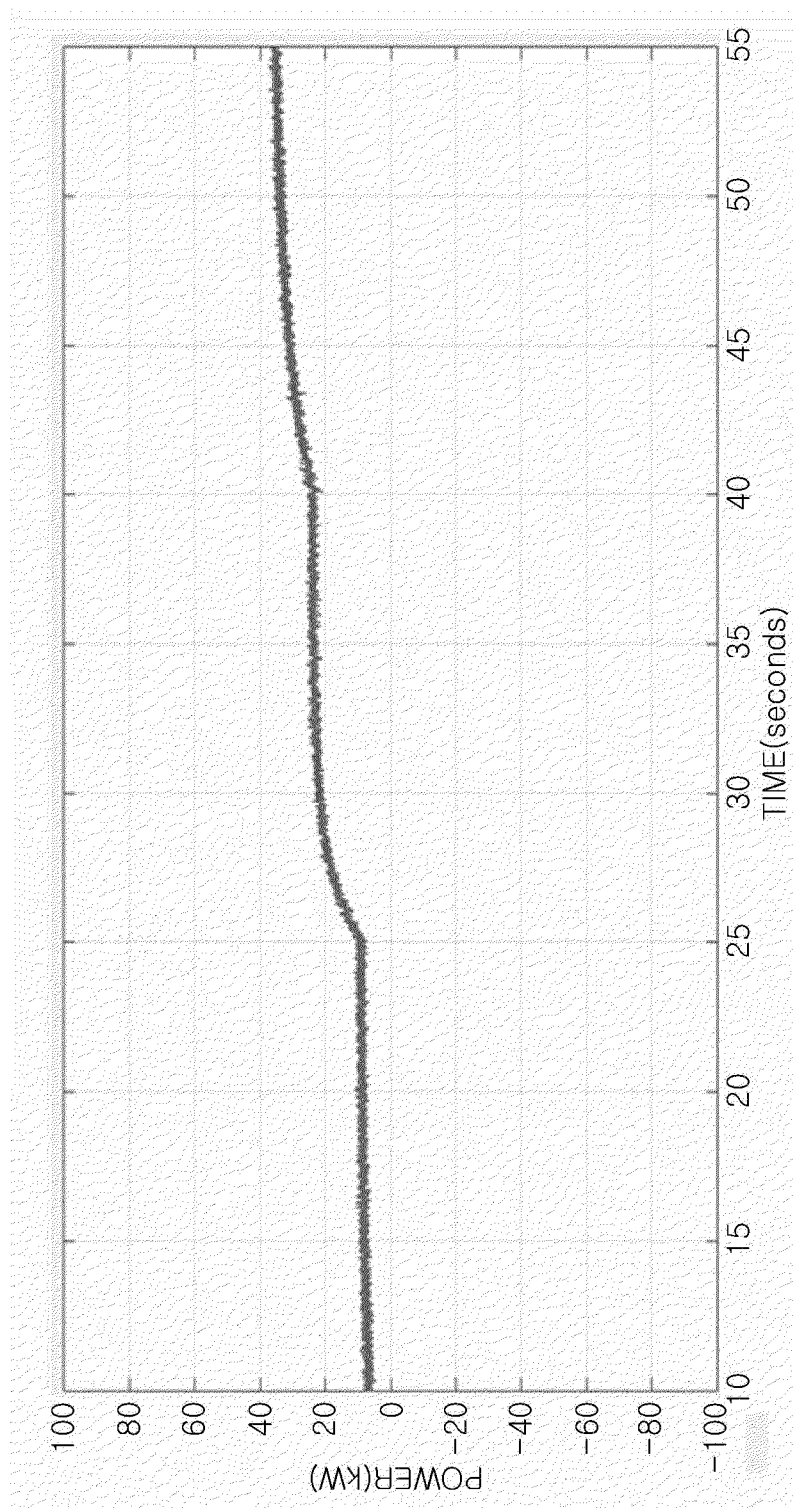
FIGS. 4 to 6 are exemplary diagrams illustrating a DC connection based operation example to which a method for controlling multi-frequencies of a microgrid according to an embodiment of the present invention is applied and a simulation result is shown.
Figure 4B:
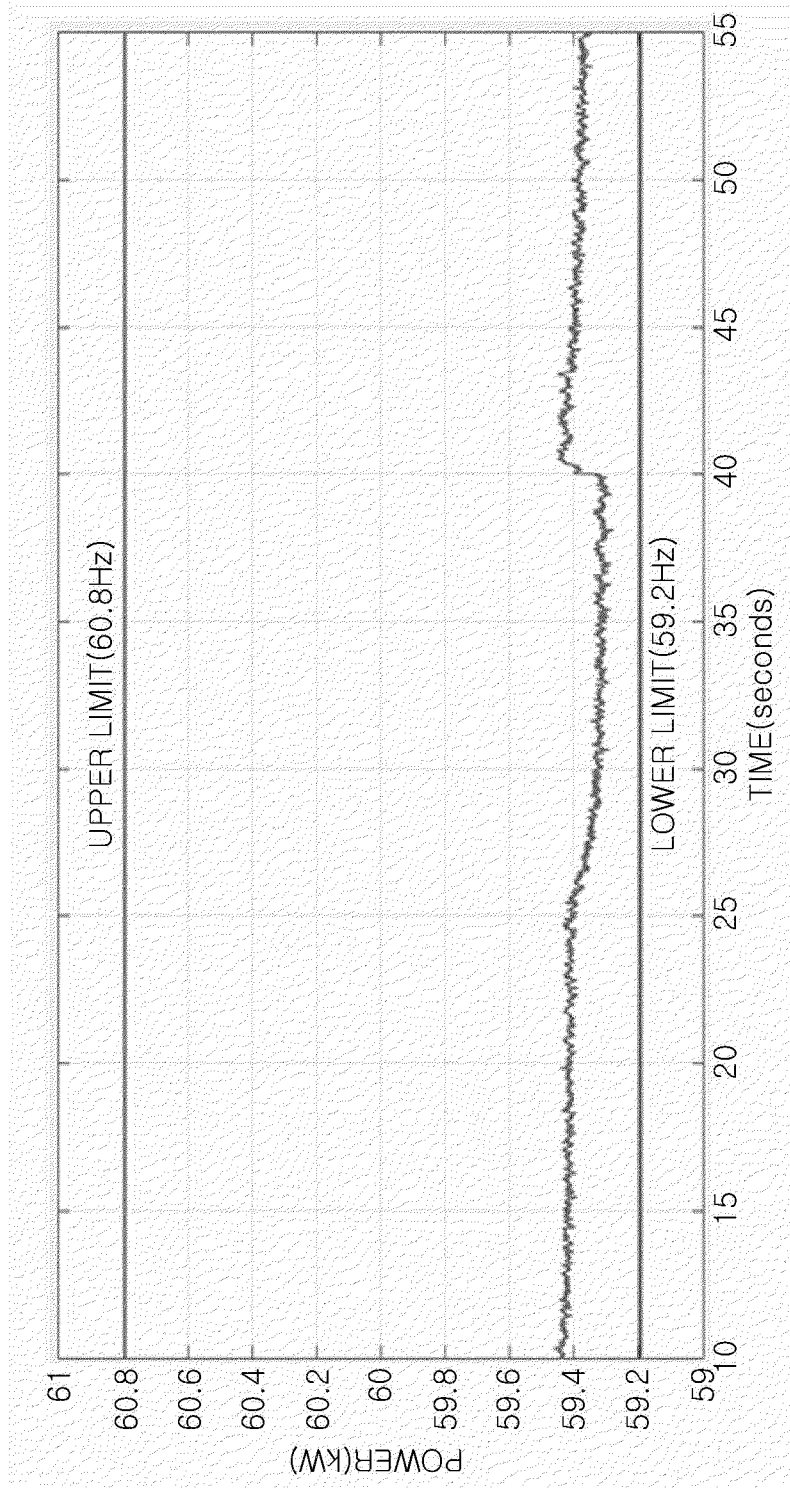
Figure 5A:
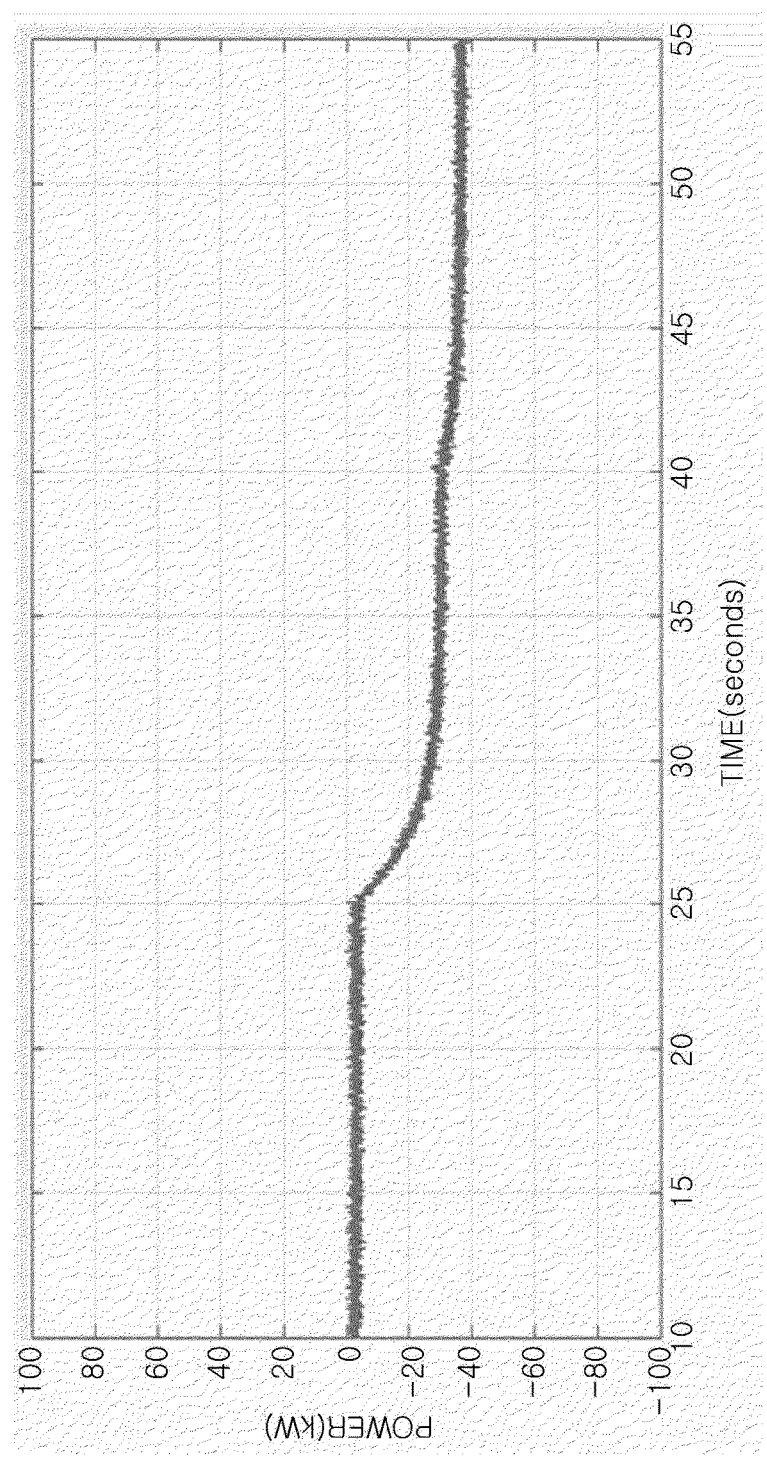
Figure 5B:
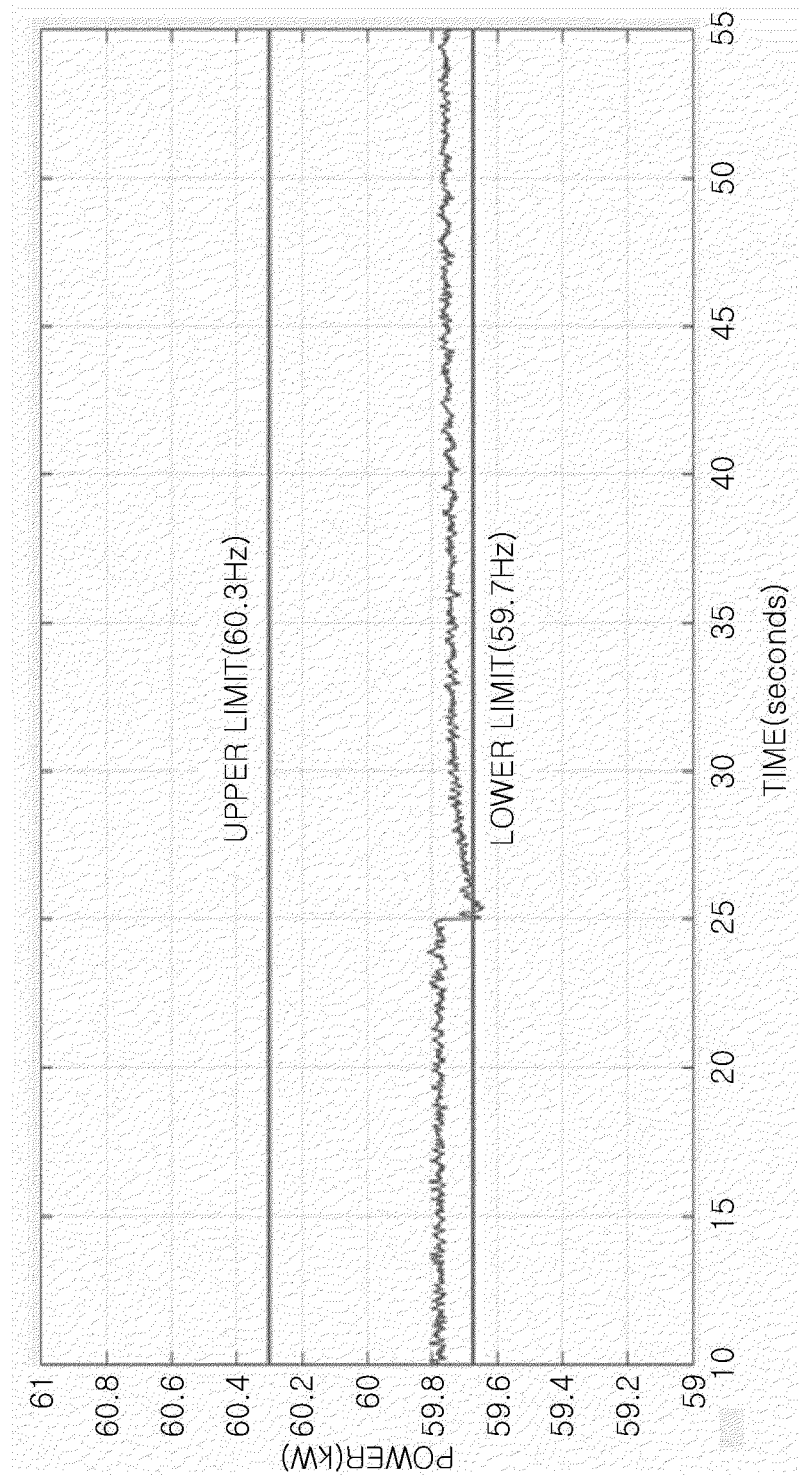

Meanwhile, FIGS. 4 to 6 are diagrams illustrating a DC connection based operation example to which a method for controlling multi-frequencies of multiple stand-alone microgrids according to an embodiment of the present invention is applied and a simulation result and it is assumed that three microgrids are connected and in a simulation scenario, allowable frequencies of the respective microgrids are 59.2 to 60.8 Hz (first microgrid), 59.7 to 60.3 Hz (second microgrid), 59.5 to 60.5 Hz (third microgrid), respectively. Further, a load of the second microgrid is set to increase at 25 seconds and the load of the first microgrid is set to decrease at 40 seconds.

Based on the setting, first, referring to FIG. 4, as illustrated in FIG. 4a, it can be seen that the first VSC increases a power supply amount in order to supply power to the second microgrid with the increase of the load of the second microgrid at 25 seconds (the power supply amount increases in a positive direction of P1).

It can be seen that since a surplus generation amount increases in the first microgrid with the decrease of the load of the first microgrid at 40 seconds, an output amount of the first VSC increases in order to establish a balance of the normalized frequency values of all microgrids (the power supply amount increases in the positive direction of P1).

It can be seen that the frequency of the first microgrid is controlled within the allowable frequency (59.2 to 60.8 Hz) as illustrated in FIG. 4b according to the control of the first VSC.

Subsequently, as illustrated in FIG. 5a, it can be seen that the second VSC is controlled to receive the other microgrid power for the frequency control within the allowable range of the second microgrid with the increase of the load of the second microgrid at 25 seconds (the received wattage increases in a negative direction of P2).

It can be seen that since the surplus generation amount increases in the first microgrid with the decrease of the load of the first microgrid at 40 seconds, the wattage of the second VSC is controlled so that wattage received from the other microgrid increases in order to establish the balance of the normalized frequency values of all microgrids (the received wattage increases in the negative direction of P2).

It can be seen that the frequency of the second microgrid is controlled within the allowable frequency (59.7 to 60.3 Hz) as illustrated in FIG. 5a according to the control of the second VSC.

Figure 6A:
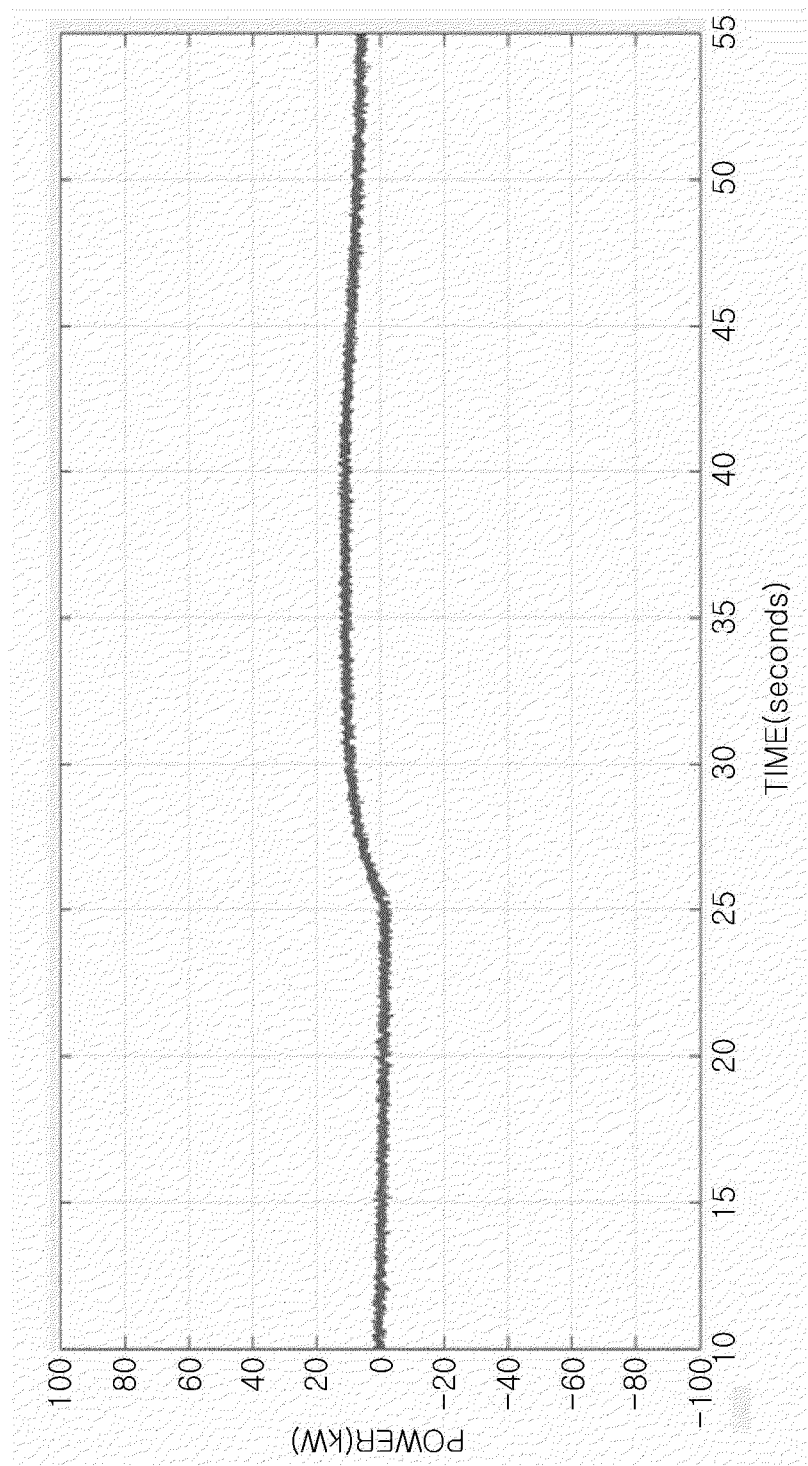

Last, it can be seen that the third VSC may verify that the power supply amount increases in order to supply the power to the second microgrid with the increase of the load of the second microgrid at 25 seconds as illustrated in FIG. 6a (the power supply amount increases in the positive direction of P3).

Since the surplus generation amount of the first microgrid increases with the decrease of the load of the first microgrid at 40 seconds and a load amount of the third microgrid is not changed, surplus power of the first microgrid is transmitted to the second microgrid as described above in order to establish the balance of the normalized frequency values of all microgrids, and as a result, a role for the third microgrid to maintain the balance of the normalized frequency values of all microgrids decreases, thereby decreasing the power supply amount of VSC 3.

Figure 6B:
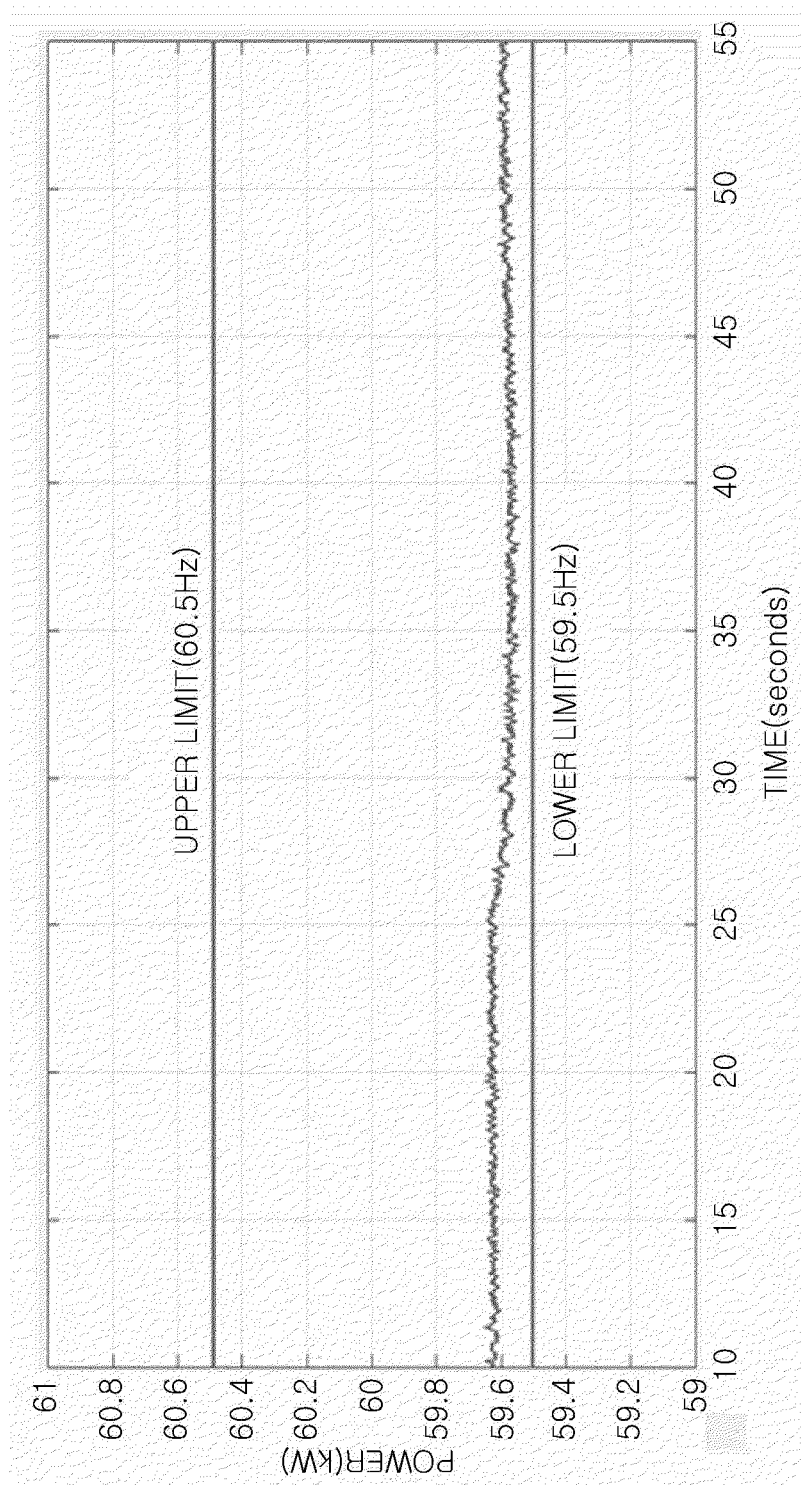

It can be seen that the frequency of the third microgrid is controlled within the allowable frequency (59.5 to 60.5 Hz) as illustrated in FIG. 6b according to the control of the third VSC.

Hereinabove, a configuration of a system for controlling multi-frequencies of multiple stand-alone microgrids according to an embodiment of the present invention has been described.

Hereinafter, a method for controlling multi-frequencies of multiple stand-alone microgrids according to an embodiment of the present invention will be described in detail with reference to FIG. 7.

Figure 7:
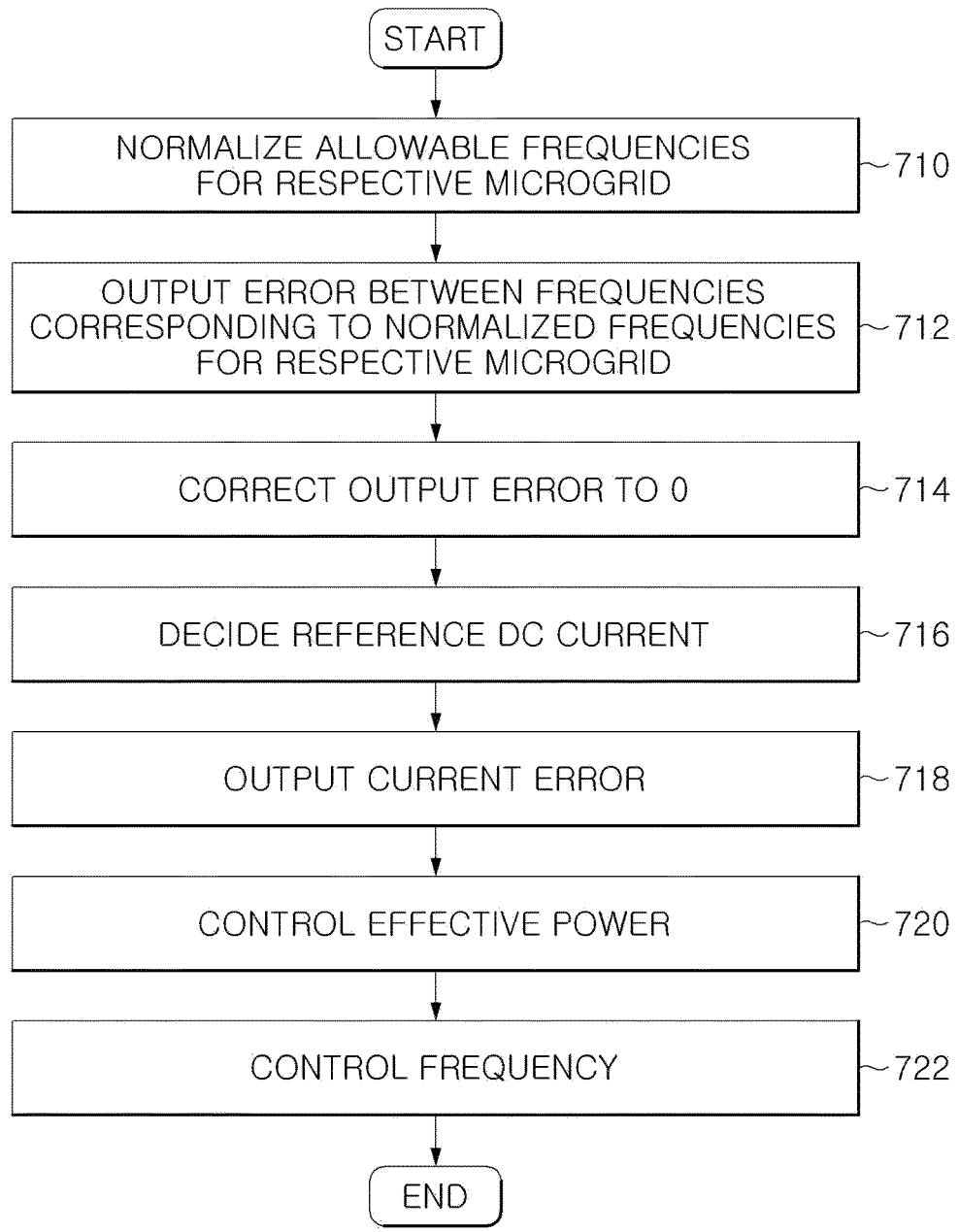
FIG. 7 is an overall flowchart regarding the method for controlling multi-frequencies of a microgrid according to an embodiment of the present invention.

FIG. 7 is an overall flowchart regarding the method for controlling multi-frequencies of multiple stand-alone microgrids according to an embodiment of the present invention.

Referring to FIG. 7, first, in process 710, a frequency for each of the multiple microgrids is normalized through a normalizing unit of a voltage source converter (VSC).

In more detail, different frequencies are set in the multiple microgrids and become allowable frequencies for corresponding microgrids. The VSC normalizes input allowable frequency for each of the multiple microgrids by an operation of process 710 through the normalizing unit and frequencies (−1 to 1) normalized for respective stand-alone microgrids are controlled to be maintained at the same value by using an equation given below. For example, when a frequency $f_{normal}^1$ of one microgrid becomes 0.1, frequencies $f_{normal}^2$ to $f_{normal}^n$ of all microgrids are controlled to be maintained at 0.1.

$$f_{normal}^n = \frac{f - 0.5(f_{max}^n + f_{min}^n)}{0.5(f_{max}^n - f_{min}^n)}, -1 \le f_{normal}^n \le 1 \quad \text{Equation 2}$$

In process 712, an error between frequencies corresponding to the normalized frequencies of the microgrids is output through an error output unit.

In process 714, correction for making the error output between the normalized frequencies be 0 is performed through a PI controller.

For example, when n microgrids are present, a k-th VSC performs control for making a difference of the normalized values be 0 by inputting a normalized frequency of a k-th microgrid and a k+1-th normalized frequency.

In this case, a last n-th VSC performs control for making the difference in normalized value be 0 by inputting a normalized frequency of an n-th microgrid and a normalized frequency of an (n−1)-th microgrid.

Subsequently, in process 716, reference d-axis current is decided through a predetermined equation and in process 718, an error of the decided reference d-axis current and actual d-axis current is output through the error output unit.

The current decision equation as the predetermined equation has a form of $$I_{d1}^* = \frac{2P_1^*}{3V_1}$$

and since effective power needs to be controlled in order to change the frequency of the microgrid premised on a known frequency equation and an effective power equation, d-axis current $I_{d1}^*$, $I_{dk}^*$, and $I_{dn}^*$ for frequency control is decided through the respective VSC controllers and respective errors of the decided d-axis current and actual d-axis current are output to output control signals for controlling the multi-frequencies through current controllers.

Such an operation is performed through an operation of process 720 and thereafter, a control signal for controlling multi-frequencies is generated by the current controller through process 722.

In this case, the control signal is a reference d-axis current based signal for changing the effective power associated with the frequency control for each microgrid.

The control signal is used for controlling the multi-frequencies of multiple stand-alone microgrids and each of the VSCs connected to the multiple stand-alone microgrids which are connected makes a difference in normalized frequency between DC-line based adjacent microgrids be 0 by using as an input a normalized frequency of the corresponding microgrid and a normalized frequency of a microgrid corresponding to a VSC followed by 1 based on a predetermined order relationship to similarly control normalized frequencies associated with the allowable frequencies of the multiple connected microgrids to be the same as each other.

A VSC having a lowest ranking based on the predetermined order relationship similarly controls the normalized frequencies associated with the allowable frequencies of the multiple connected microgrids by making the difference in normalized frequencies between the adjacent microgrids based on the DC line be 0 by using as an input the normalized frequency of the corresponding microgrid and the normalized frequency of the microgrid corresponding to the VSC preceded by 1 based on the predetermined order relationship.

As described above, the operations associated with the system and the method for controlling multi-frequencies of a microgrid according to the present invention may be performed and meanwhile, in the description of the present invention, detailed embodiments have been described, but various modifications can be executed without departing from the scope of the present invention. Accordingly, the scope of the present invention should be decided by not the described embodiments but by the claims and those equivalent thereto.

What is claimed is:

1. A system for controlling multi-frequencies of a microgrid, the system comprising:
   a stand-alone (off-grid) microgrid including one or more distribution power supplies and energy storage systems; and
   a voltage source converter (VSC) connecting multiple stand-alone microgrids through a DC line and performing power conversion for DC connection of AC based stand-alone microgrids and performing multi-frequency control considering a load quality level for each microgrid.

2. The system for controlling multi-frequencies of a microgrid of claim 1, wherein the VSC includes a normalizing unit connected to connection points of the microgrids to normalize frequencies of the respective microgrids.

3. The system for controlling multi-frequencies of a microgrid of claim 2, wherein:
   the normalizing unit normalizes allowable frequencies set differently for the respective microgrids to −1 to 1 by using an equation given below $$f^n_{normal} = \frac{f - 0.5(f^n_{max} + f^n_{min})}{0.5(f^n_{max} - f^n_{min})}, -1 \leq f^n_{normal} \leq 1.$$

4. The system for controlling multi-frequencies of a microgrid of claim 2, wherein each of the VSCs connected to the multiple stand-alone microgrids which are connected makes a difference in normalized frequencies between DC-line based adjacent microgrids be 0 by using as an input a normalized frequency of corresponding microgrid and a normalized frequency of a microgrid corresponding to a VSC followed by 1 based on a predetermined order relationship to similarly control normalized frequencies associated with the allowable frequencies of the multiple grid-connected microgrids to be the same as each other.

5. The system for controlling multi-frequencies of a microgrid of claim 4, wherein a VSC having a lowest ranking based on the predetermined order relationship among the respective VSCs corresponding to the multiple connected stand-alone microgrids similarly controls the normalized frequencies associated with the allowable frequencies of the multiple connected stand-alone microgrids by making the difference in normalized frequencies between the adjacent microgrids based on the DC line be 0 by using as an input the normalized frequency of the corresponding microgrid and the normalized frequency of the microgrid corresponding to the VSC preceded by 1 based on the predetermined order relationship.

6. The system for controlling multi-frequencies of a microgrid of claim 2, wherein the allowable frequencies for the respective microgrids are normalized through supplying power for each microgrid based on a controlled load by controlling the load for each microgrid for each predetermined interval.

7. The system for controlling multi-frequencies of a microgrid of claim 1, wherein the VSC performs a bipolar operation to perform power transmission through the other pole when a failure occurs in any one pole.

8. A method for controlling multi-frequencies of a microgrid, the method comprising:
   normalizing, by a normalizing unit of a voltage source converter (VSC), input allowable frequencies of multiple stand-alone microgrids;
   outputting, by an error output unit, an error between frequencies corresponding to the normalized frequencies of the microgrids;
   performing, by a PI controller, a correction for making the output error between the normalized frequencies be 0 and deciding reference DC current through a predetermined equation; and
   outputting, by an error output unit, an error between the decided reference d-axis current and actual d-axis current to generate, by a current controller, a control signal for controlling the multi-frequencies.

9. The method for controlling multi-frequencies of a microgrid of claim 8, wherein the control signal is wattage consumed in a load set based on the reference d-axis current for changing effective power associated with the frequency control for each microgrid.

10. The method for controlling multi-frequencies of a microgrid of claim 8, wherein in the generating of the control signal for controlling the multi-frequencies, each of the VSCs connected to the multiple stand-alone microgrids which are grid-connected makes a difference in normalized frequencies between DC-line based adjacent microgrids be 0 by using as an input a normalized frequency of corresponding microgrid and a normalized frequency of a microgrid corresponding to a VSC followed by 1 based on a predetermined order relationship to similarly control normalized frequencies associated with the allowable frequencies of the multiple grid-connected stand-alone microgrids to be the same as each other.

11. The method for controlling multi-frequencies of a microgrid of claim 10, wherein a VSC having a lowest ranking based on the predetermined order relationship among the respective VSCs connected to the multiple connected stand-alone microgrids similarly controls the normalized frequencies associated with the allowable frequencies of the multiple grid-connected microgrids by making the difference in normalized frequencies between the adjacent microgrids based on the DC line be 0 by using as an input the normalized frequency of the corresponding microgrid and the normalized frequency of the microgrid corresponding to the VSC preceding by 1 based on the predetermined order relationship.

12. The method for controlling multi-frequencies of a microgrid of claim 8, wherein the generating of the control signal for controlling the multi-frequencies is performed through supplying power for each microgrid based on a controlled load by controlling the load for each microgrid for each predetermined interval.

* * * * *